Dec. 2, 1952        M. J. OLSCHWANG        2,619,793

DIAL INDICATOR

Filed Jan. 6, 1948

INVENTOR.
MORRIS J. OLSCHWANG

BY
Van Deventer & Grier

ATTORNEYS

Patented Dec. 2, 1952

2,619,793

UNITED STATES PATENT OFFICE 2,619,793

DIAL INDICATOR

Morris J. Olschwang, New York, N. Y.

Application January 6, 1948, Serial No. 800

8 Claims. (Cl. 58—126)

This invention relates to dial indicators for use on various types of measuring and indicating apparatus and more particularly to dial indicators wherein two dials are associated, one of said dials being movable in order to successively display indicants produced by the cooperative relationship of markings on both dials when said movable dial is moved.

An object of the invention is to provide a dial of the character described which is easily readable to give indications of two quantities with but a single movable element; further objects will be apparent from the following specification.

By way of illustration, the device will be herein described as applied to clocks, but it will be understood that, as hereinafter pointed out, the invention may be applied to many other types of measuring and indicating apparatus.

It will therefore be understood that many changes and modifications can be made in the arrangement and marking of the dials herein disclosed without departing from the inventive concept which is as defined in the appendant claims.

The device herein described relates primarily to clocks and other time measuring devices, and employs a single rotating element to indicate both the hour and the minutes elapsed; the indication appearing on the face of the clock in a manner similar to that in the conventional timepiece having two rotating "hands" or indicators.

Figure 1:
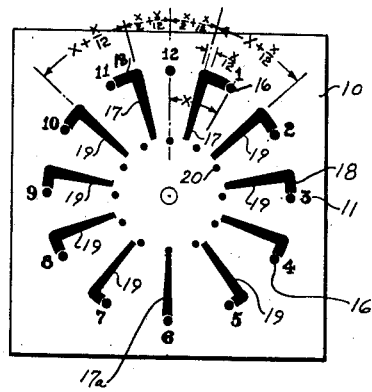
Figure 1 is a view of a fixed dial embodying the invention.
Figure 2:
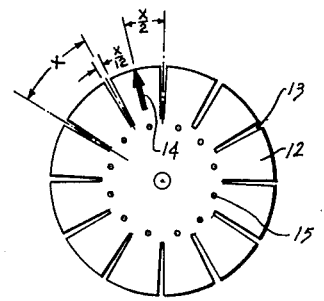
Figure 2 is a view of a rotatable dial for use with a fixed dial shown in Figure 1.

Referring to Figure 1, the numeral 10 indicates the face of a clock with appropriate hour markings indicated by the numeral 11 thereon, and Figure 2 shows a second dial 12 forming an indicating element. These dials may be made of a thin sheet of metal, plastic composition, or other suitable opaque material. It will be noted that the indicator 12 is provided with twelve equally spaced slots 13 which form radially disposed indicants, the angular displacements between the center lines of the slots being equal to X. On a radial line, midway between two of the slots, an arrow 14 is painted or otherwise indicated.

Spaced midway between the radial centers of the slots 13, an inner circle of holes forming indicants are placed as shown at 15, to cooperate with indicants 20 to be presently described on dial 10.

On the outer portion of the dial 10 on each side of the vertical axis and displaced therefrom by an angle $$\frac{X}{2} \text{ plus } \frac{X}{12}$$

will be seen markings or secondary indicants 17 and from the tops of these markers circumferential branches 18 carry the eye to the adjacent dots 16. Between these radial markers and the radial indicant 17a at "6," a series of similar secondary indicant markers 19 having an angular spacing of $$X \text{ plus } \frac{X}{12}$$

is shown. An inner circle of indicant dots indicated by the numeral 20 equal in size to the holes 15 as shown in Figure 2 and located on a radius equal to that of the said holes 15, are located on the dial 10. These dots are located on the same radial centers as the large dots 16.

Assume that the indicator 12, Figure 2 is placed over the dial Figure 1 in a position such that its center coincides with that of the dial and the arrow 14 of the indicator points to the indicants 11 at "12 o'clock." A check will show that none of the radial markings 17, 19 on the dial 10 will be visible through the slots 13 in the opaque indicator 12. The inner circle of dots 20 will, however, be visible through the small holes 15 in the indicator 12. This will indicate that the arrow is exactly "on the hour."

Now rotate the indicator 12 clockwise by an angle equal to $$\frac{X}{12}$$

It will soon be seen that the radial marking 17 at indicants 11 at "1 o'clock or five minutes after the hour" will be fully visible. If the indicator is again rotated by an angle equal to $$\frac{X}{12}$$

the marker at "1 o'clock" will be hidden and the marker 19 at "2 o'clock" will be fully visible, indicating "10 minutes past the hour."

Figure 3:
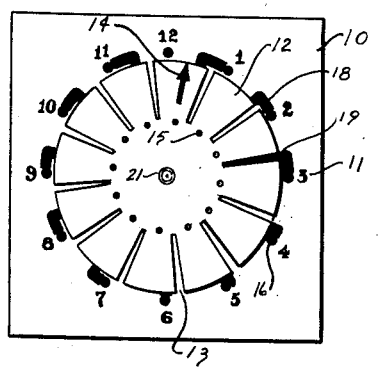
Figure 3 is a view showing the dials, Figures 1 and 2 in combination.

Figure 3 shows the rotating indicator assembled on the hour shaft 21 of a clock and indicating "quarter past twelve." The arrow 14 indicates the hour on indicants 11 and the radial marker 19 the minutes on one of indicants 19. As the indicator turns, a new marker 17 or 19 becomes visible every five minutes, all the markers appearing in turn in the course of an hour.

When the arrow is again "on the hour," no radial marker will be visible and the small dots 20 will again appear through holes 15. During the period of transition from one slot to the next, a portion of each of two adjacent radial markers will be seen, permitting fractions of five minute periods to be estimated with greater accuracy than is ordinarily necessary.

For the dots indicating the "on the hour" position, any other marking which will appear at the proper instant may be substituted or this feature may be eliminated entirely.

Figure 4:
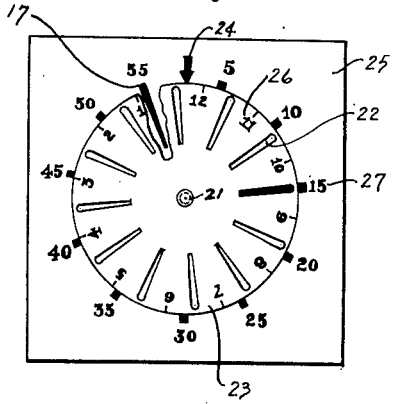
Figure 4 is a modification of the invention.

Many modifications in design are possible, and some of these are shown in Figure 4. Elongated holes 22 forming indicants may be substituted for the slots 13 in the rotating element 23.

The rotating element 23 may be made of glass or other transparent material, which has been rendered opaque, except for transparent "windows" 22 spaced so as to serve in place of slots or holes. The indicating arrow 24 may be painted on the stationary dial 25, and numbers indicated by numeral 26 and indicating the hours are printed on the rotating element. The radial markings indicated by numeral 27 may be separately numbered, either from 1 to 12, or in such manner as to indicate the passage of five minutes between each marking. Any additional suitable "on the hour" indicating arrangement such as holes 15 and dots 20, Figures 1 and 2 may be incorporated if desired.

The radial markings such as 17, Figure 4 are radially spaced the same as those shown in Figure 1 at 17 and Figure 4 also has the markings 19 of Figure 1.

Figure 5:
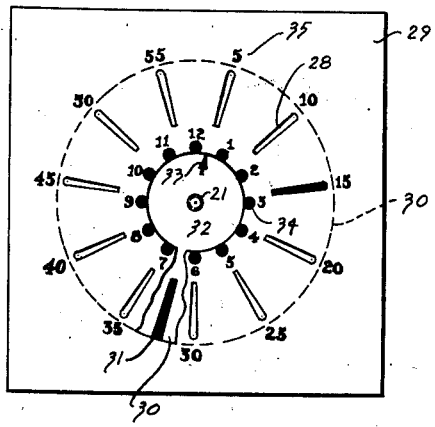
Figure 5 is a view showing a further modification of the invention.

Figure 5 shows another modification. With this arrangement, the slots or holes 28 are formed in the stationary dial 29, and the rotating element shown in dotted lines at 30, properly marked with equally spaced radial lines indicated at 31, rotates behind the dial 29, the radial markings coming into view at the proper moments.

In lieu of this arrangement the dial 29 (or any of the other stationary dials herein disclosed) may be painted on the glass lens cover or crystal of a clock or watch, the radial markings, in each case, appearing transparent against an opaque background with the indicator such as 30 and 33 rotating directly behind the lens and visible through a transparent portion.

The center of dial 29 is cut away at 32 (or is transparent) so as to display the indicator 31 which is attached to dial 30. Dial 30, is of course, attached to the hour shaft 21.

The hour indicants 34 are printed about the path of travel of the indicator 33 on dial 29.

The minute indicants 35 may be placed at the outer ends of the slots 28 on dial 29.

The operation of the modification shown in Figures 4 and 5, so far as the progressive operation of the slots 22 or 28 are concerned, is the same as described in connection with the device, Figures 1 to 3 inclusive.

While this description has been based on the use of the invention in a clock, it is obvious that it will find application in many other types of measuring or indicating gauges, etc.

For instance, the device may readily be arranged so that the arrows such as 14, 24, 33 will indicate units, and the radial markers 17, 17 or 31 will indicate tenths. Likewise, the device may be utilized in connection with an indicator having purely linear motion or rotating around a cylinder instead of the circular rotation of the devices herein described.

It will be evident from the above that similar cooperative and fixed and movable dials may be provided to indicate any desired number of divisions of a circle and corresponding fractions thereof, the relationship and angular magnitudes being stated by the following formula, wherein N is the number of divisions:

Angle between divisions =
$$\frac{360°}{N}$$

(For rotating dial)
Width of radial marks =
$$\frac{360°}{N^2}$$

(For rotating and stationary dials)
Angular distances from zero point to center line of first radial mark and last radial marks =
$$180°\left(\frac{1}{N}+\frac{2}{N^2}\right)$$

(Stationary dial)
Angular distance between center lines of adjacent radial marks other than first and last marks =
$$360°\left(\frac{1}{N}+\frac{1}{N^2}\right)$$

The term "indicants" as used throughout this specification and the accompanying claims is employed to denote that which indicates; for example, the slots 13, the hand 14, the markings 17, 19, holes 15 and dots 20. Such indicants may be marks, or may be transparent or opaque portions of the dials. Any suitable means that will indicate may be employed without departing from the spirit of the invention.

What is claimed is:

1. An indicator including a dial having a single set of quantity figures and a plurality of indicants thereon, a second dial concentric with said first dial and having at least one indicant thereon and a plurality of indicant displaying means spaced at equal angular distances around the entire second dial, said quantity figures and indicant displaying means being in cooperating relationship whereby upon rotation of one of said dials a plurality of significantly related combination indications may be observed at spaced-apart locations on said dials, said combination indications being indicative of whole numbers and related fractions; said first dial including means visibly and permanently connecting certain of said indicants with certain of said figures whereby said single set of figures may be representative both of said whole numbers and said fractions.

2. The indicator as claimed in claim 1 wherein said first dial is fixed and the indicants thereon include a plurality of markings at equal angular distances.

3. An indicator including a fixed dial having an aperture therein and a first progressive series of quantity-indicating indicants arranged circumferentially on its face about said aperture, a rotatable dial underlying said fixed dial, a pointer-indicant carried by said rotatable dial and visible through the aperture in the fixed dial and adapted to successively point to said first indicants as said rotatable dial is rotated, said rotatable dial having a plurality of radially spaced indicants thereon lying below said fixed dial, said fixed dial also having therein a plurality of radially spaced apertures adapted to successively display said radially spaced indicants on said rotatable dial, and a second progressive series of quantity-indicating indicants on said fixed dial spaced apart from said first indicants with said apertures lying therebetween.

4. A clock face comprising a fixed dial having hour and minute intervals marked thereon in two separate concentric circles, a plurality of radially spaced openings in said dial located in the space between said concentric circles of marks, and an hour dial cooperatively associated with said fixed dial and having an hour pointer cooperating with the inner hour marks on said fixed dial and a plurality of marks adapted to be successively displayed through said radially spaced openings to indicate minutes.

5. In an indicator, a dial having a plurality of angularly spaced primary indicants thereon indicating N divisions, the angle between said divisions being $$\frac{360°}{N}$$

a plurality of secondary indicants respectively related to said primary indicants, the angular distances from zero point to the center lines of the first and last secondary indicants being $$180°\left(\frac{1}{N}+\frac{2}{N^2}\right)$$

the angular distance between center lines of said other adjacent secondary indicants being $$360°\left(\frac{1}{N}+\frac{1}{N^2}\right)$$

and a relatively movable cooperative dial having N slots of equal angular spacing and angular slot widths of $$\frac{360°}{N^2}$$

6. An indicator including a fixed dial having an aperture therein and a first series of quantity-indicating indicants arranged circumferentially on its face about said aperture, a rotatable dial underlying said fixed dial, a pointer indicant carried by said rotatable dial and visible through the aperture in the fixed dial, said rotatable dial having a plurality of indicants thereon, said fixed dial also having therein a series of indicants adapted to successively display the indicants on said rotatable dial.

7. In an indicator, a dial having a plurality of angularly spaced primary indicants thereon indicating N divisions, the angle between said divisions being $$\frac{360°}{N}$$

a plurality of secondary indicants respectively related to said primary indicants, the angular distance from a pre-determined point on said dial to the center line of each secondary indicant adjacent said point being $$180°\left(\frac{1}{N}+\frac{2}{N^2}\right)$$

the angular distance between center lines of said other adjacent secondary indicants being $$360°\left(\frac{1}{N}+\frac{1}{N^2}\right)$$

and a relatively movable cooperative dial having N slots of equal angular spacing.

8. In an indicator, a dial having a plurality of angularly spaced primary indicants thereon extending throughout a predetermined angle $\theta$ and comprising N divisions, the angle between said divisions being $$\frac{\theta}{N}$$

degrees, a plurality of secondary indicants respectively related to said primary indicants, the angular distance from a pre-determined point on said dial to the center line of each secondary indicant adjacent said point being $$\frac{\theta}{2}\left(\frac{1}{N}+\frac{2}{N^2}\right)$$

the angular distance between center lines of said other adjacent secondary indicants being $$\theta\left(\frac{1}{N}+\frac{1}{N^2}\right)$$

and a relatively movable cooperative dial having N slots of equal angular spacing.

MORRIS J. OLSCHWANG.

REFERENCES CITED

The following references are of record in the file of this patent:

UNITED STATES PATENTS

| Number | Name | Date |
|---|---|---|
| 2,293,459 | Ewing et al. | Aug. 18, 1942 |

FOREIGN PATENTS

| Number | Country | Date |
|---|---|---|
| 495,047 | Germany | Aug. 19, 1933 |
| 800,890 | France | May 11, 1936 |